US009250631B2

(12) United States Patent
Becker et al.

(10) Patent No.: US 9,250,631 B2
(45) Date of Patent: Feb. 2, 2016

(54) CONTINUOUS FLOW REGULATOR FOR VEHICLE HEATING SYSTEMS

(75) Inventors: Aaron Becker, Atlanta, GA (US); Myron Stein, Laguna Niguel, CA (US)

(73) Assignee: AirSept, Inc., Atlanta, GA (US)

( * ) Notice: Subject to any disclaimer, the term of this patent is extended or adjusted under 35 U.S.C. 154(b) by 602 days.

(21) Appl. No.: 13/540,963

(22) Filed: Jul. 3, 2012

(65) Prior Publication Data
US 2013/0008529 A1    Jan. 10, 2013

Related U.S. Application Data

(60) Provisional application No. 61/505,712, filed on Jul. 8, 2011.

(51) Int. Cl.
*G05D 7/01* (2006.01)
*B60H 1/00* (2006.01)

(52) U.S. Cl.
CPC .......... *G05D 7/0133* (2013.01); *B60H 1/00485* (2013.01); *Y10T 137/7788* (2015.04)

(58) Field of Classification Search
CPC ............. B06H 1/00485; G05D 7/0133; Y10T 137/7788
USPC .................. 137/460, 498, 501, 504
See application file for complete search history.

(56) References Cited

U.S. PATENT DOCUMENTS

| | | | | |
|---|---|---|---|---|
| 1,258,114 A | * | 3/1918 | Hayward | 137/517 |
| 2,761,462 A | * | 9/1956 | Rush | 137/101 |
| 2,874,785 A | * | 2/1959 | Muse | 166/320 |
| 3,324,673 A | * | 6/1967 | Lindahl et al. | 62/196.4 |
| 3,659,433 A | * | 5/1972 | Shaw | 62/511 |
| 3,735,777 A | * | 5/1973 | Katzer et al. | 137/514.5 |
| 4,436,111 A | * | 3/1984 | Gold et al. | 137/498 |
| 4,456,029 A | * | 6/1984 | McCrum | 137/498 |
| 4,465,093 A | * | 8/1984 | Gold et al. | 137/498 |
| 4,590,962 A | * | 5/1986 | Tespa | 137/498 |
| 4,605,039 A | * | 8/1986 | Johnson et al. | 137/460 |
| 5,799,684 A | * | 9/1998 | Cluett | 137/68.15 |
| 6,408,870 B1 | * | 6/2002 | Dulin | 137/462 |
| 6,443,180 B1 | * | 9/2002 | Samuelson et al. | 137/460 |
| 7,111,638 B2 | * | 9/2006 | Johnson | 137/460 |
| 7,191,962 B2 | * | 3/2007 | Byron et al. | 239/574 |
| 7,225,830 B1 | * | 6/2007 | Kershaw | 137/512.1 |
| 7,318,556 B2 | * | 1/2008 | Lee et al. | 239/572 |
| 2008/0279707 A1 | * | 11/2008 | Fuchs et al. | 417/559 |

* cited by examiner

*Primary Examiner* — William McCalister
(74) *Attorney, Agent, or Firm* — Womble Carlyle Sandridge & Rice LLP

(57) ABSTRACT

A continuous flow regulator for vehicle heating systems includes a body configured to be connected in-line with coolant flowing through the heating coil of the heating system. A spring biased ball valve assembly is disposed in the body and is configured to restrict flow through the regulator in response to increasing flow rate of coolant and to open flow through the regulator in response to decreasing flow rate of coolant. Flow rate of coolant is therefore continuously adjusted and regulated to protect the heater core from corrosion due to high coolant flows therethrough.

22 Claims, 3 Drawing Sheets

CONTINUOUS FLOW REGULATOR FOR VEHICLE HEATING SYSTEMS

REFERENCE TO RELATED APPLICATION

Priority is hereby claimed to the filing date of U.S. provisional patent application No. 61/505,712 filed on 8 Jul. 2011.

TECHNICAL FIELD

This disclosure relates generally to vehicle heating systems and more particularly to protection of vehicle heater cores from damage due to excessive flow of coolant through the cores.

BACKGROUND

A typical vehicle heating system includes a heater core through which hot coolant from the vehicle's engine circulates to heat the core. Air is blown through fins of the core, which heats the air. The heated air is then expelled into the passenger compartment of the vehicle to provide heating.

Heater cores can deteriorate over time and require replacement. Deterioration can be caused at least in part by high pressure and high volume flows of coolant through the core. High flows, for example, can exacerbate abrasion of interior tubing of the core by particles entrained in the flows, and can cause cavitation damage particularly at bends in the tubing where cavitation can occur. There exists a need to regulate the flow of coolant through vehicle heater cores to reduce deterioration and thus expand the lives of the cores. It is to the satisfaction of this need that the present disclosure is primarily directed.

SUMMARY

Briefly described, a continuous flow regulator, in the form of a heater barb in the preferred embodiment, is disposed in-line with a heater hose delivering coolant to the heater core of a vehicle. Alternatively, the regulator may be disposed in-line with the heater hose receiving coolant from the heater core of a vehicle after the coolant has circulated through the core. Coolant circulating through the heater core is thus constrained to flow through the regulator prior to entering the heater core or after leaving the heater core. The regulator has a body with an internal passageway bounded by a generally cylindrical interior wall. A set of tapered ribs projects inwardly from the interior wall toward the axis of the channel. A ball valve assembly comprising a spherical ball and a biasing spring is disposed within the internal passageway. The ball is biased by the spring to an upstream position that provides maximum flow around the ball and through the regulator. If coolant flow exceeds a predetermined rate, the ball is moved by the flow toward the downstream end of the regulator and against the bias of the spring. This movement progressively reduces the space between the ball and the inwardly projecting tapered ribs. Accordingly, flow of coolant through the regulator and to the heater core is restricted and reduced. The ball valve assembly responds continuously in this manner to varying coolant flow rate, thereby ensuring that the heater core receives a substantially constant flow of coolant at a regulated flow rate that reduces deterioration of the core. A filter can be incorporated into the regulator if desired to entrap particulates entrained in the flow thereby reducing core deterioration through abrasion. These and other aspects, features, and advantages of the flow regulator and method of this disclosure will be better appreciated upon review of the detailed description set forth below taken in conjunction with the accompanying drawing figures, which are briefly described as follows.

DETAILED DESCRIPTION

Figure 1:
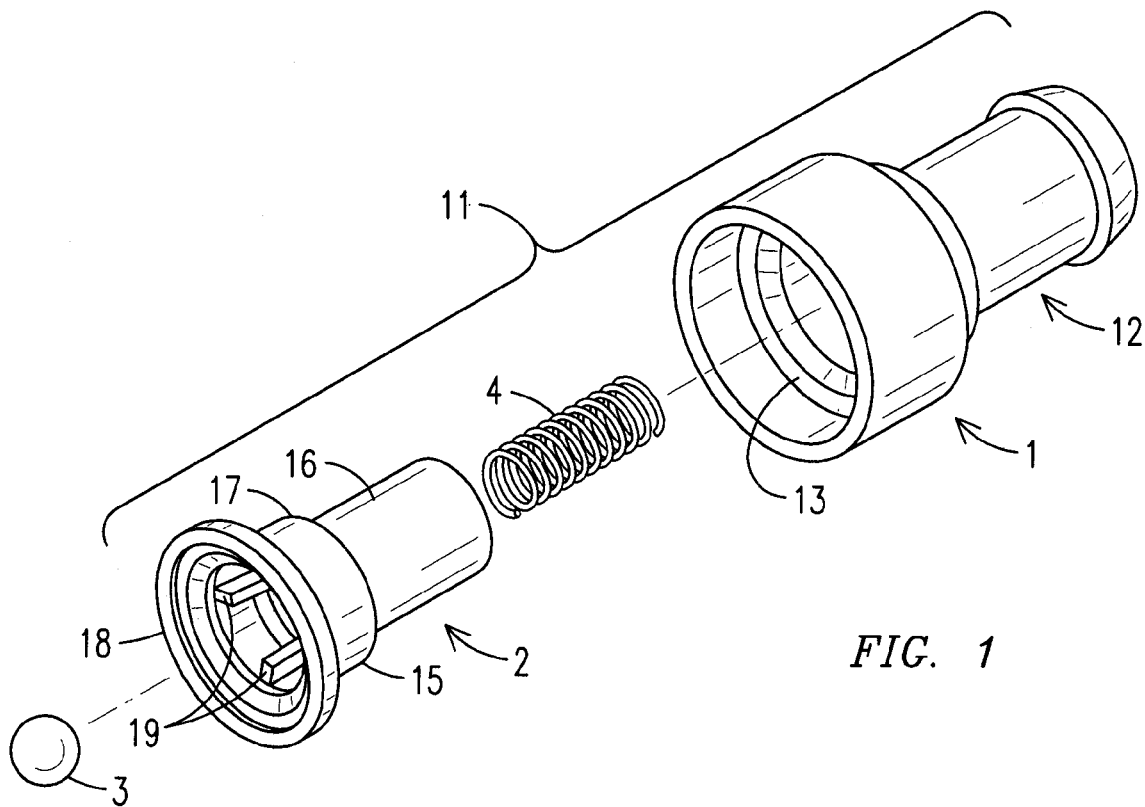
FIG. 1 is a perspective exploded view of the flow regulator of this disclosure illustrating principle components thereof.

The entire contents of U.S. provisional patent application 61/505,712, to which priority is claimed above, is hereby incorporated by reference.

Reference will now be made to the drawing figures, wherein like reference numerals indicate like parts throughout the several views. The description that follows will reference all of the drawing figures as a group, except where an individual figure is singled out.

As illustrated in the figures, a flow regulator 11 comprises an outer body 1 having a nipple 12, which, in this embodiment, is configured as a heater barb, at its downstream end for connection to a heater hose. The outer body 1 has an internal channel bounded and defined by an interior wall 21. The interior wall 21 at the pstream end of the outer body 1 is radially stepped to form internal seats 13 and 14. An inner body 2 has a barrel 16 at its downstream end and a flange 17 at its upstream end. The barrel 16 and flange 17 are separated by a radial step 15 extending around the inner body 2. The inner body 2 terminates at its upstream end in a radially extending end flange 18. A generally cylindrical central channel extends through the inner body 2 and is bounded by generally cylindrical wall 22. A set of four inwardly projecting tapered ribs extend radially inwardly from the cylindrical wall 22 and each rib tappers from a narrow dimension at the upstream end of the inner body 2 to a wide dimension at the downstream end of the inner body 2.

Figure 2:
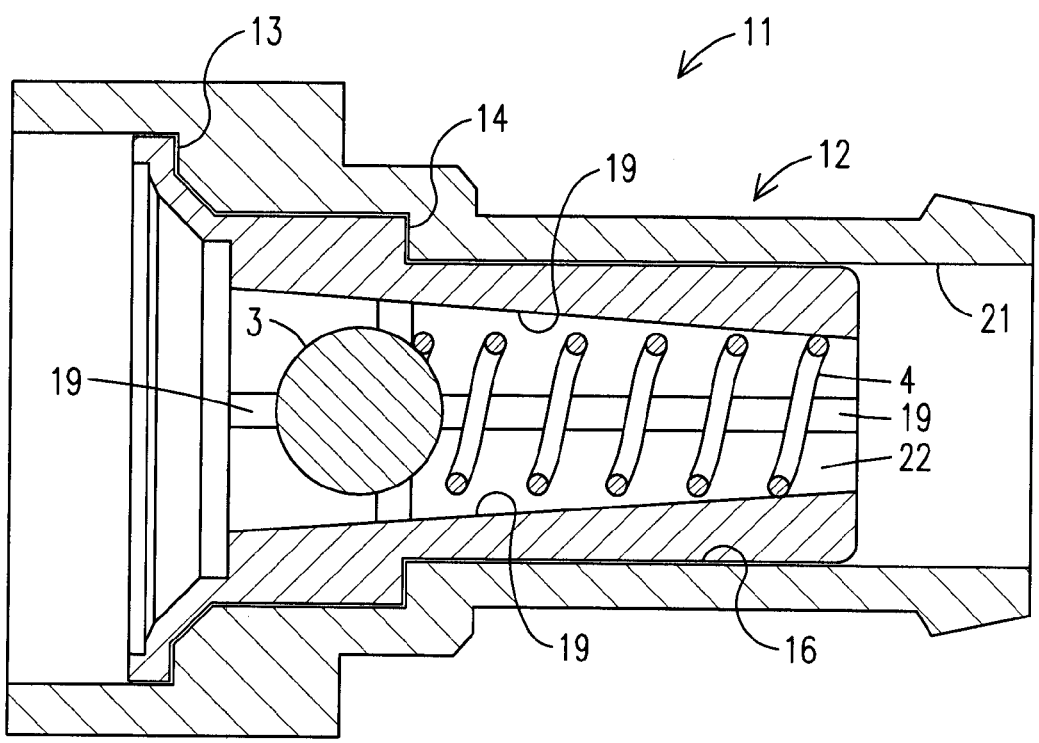
FIG. 2 is a longitudinal cross section of the flow regulator in its assembled condition illustrating the ball valve assembly.
Figure 3:
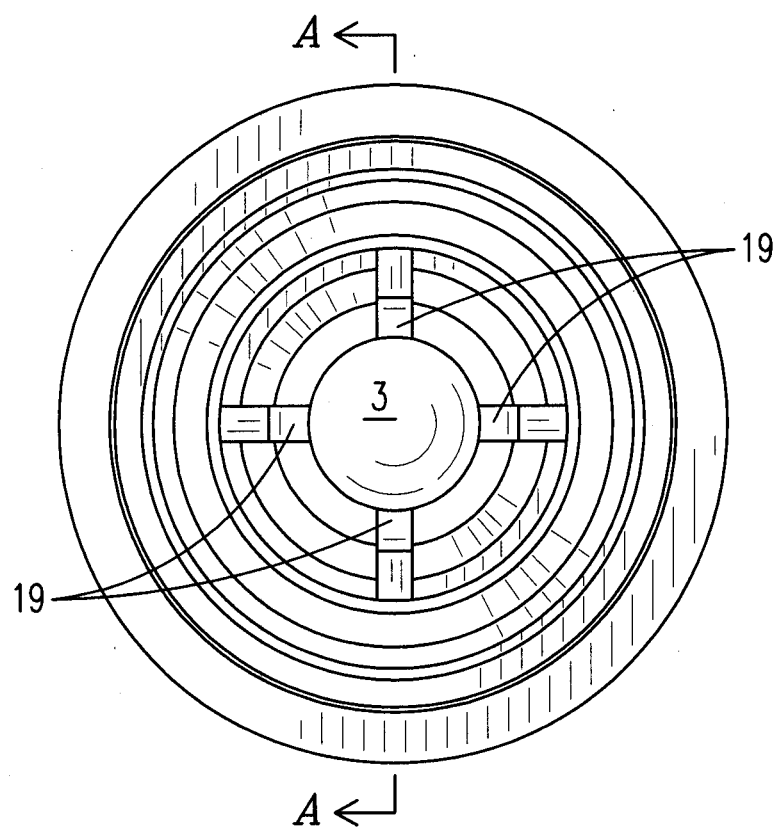
FIG. 3 is an end view of the regulator of this disclosure in its assembled condition.
Figure 5:
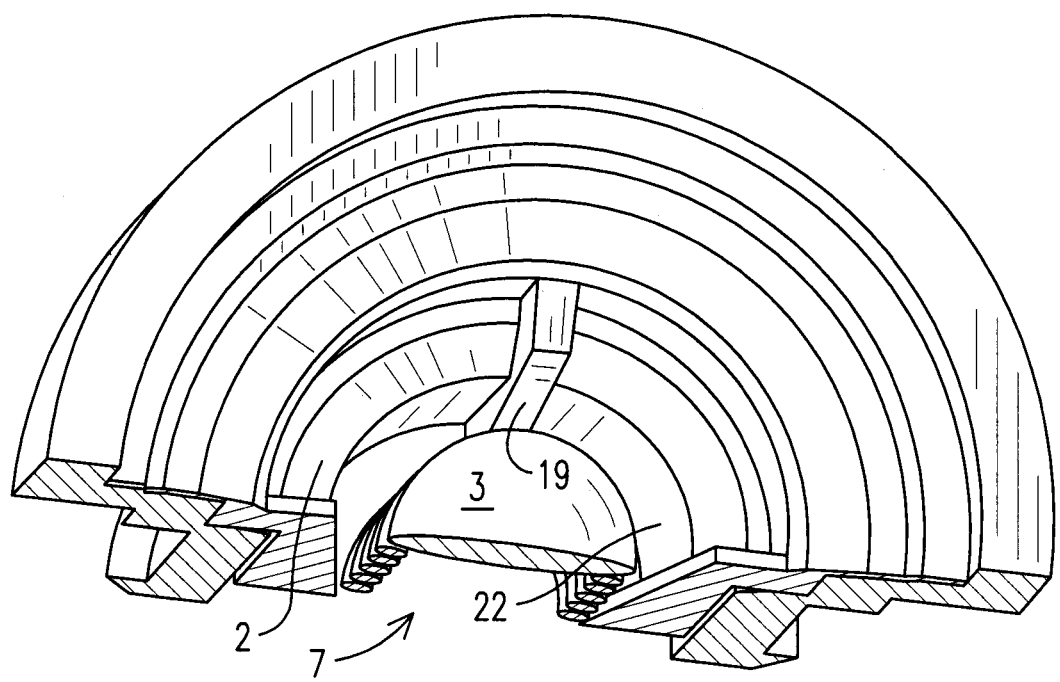
FIG. 5 is a perspective cross sectional view of the flow regulator as seen from the upstream end thereof.

A ball valve assembly 7 (FIG. 5) is disposed within the central channel of the inner body 2 and comprises a cylindrical ball 3 and a coil spring 4. As perhaps best illustrated in FIG. 2, one end of the coil spring is wedged between the ribs 19 at the downstream end of the inner body 2 and the cylindrical ball 3 is fixed to the other end of the coil spring so that the ball is located at the upstream end of the inner body 2. It will thus be appreciated that the cylindrical ball is yieldably biased by the coil spring to the position shown in FIG. 2 but can be forced to move in a downstream direction against the bias of the spring by a sufficient force from the left in FIG. 2. Significantly, as the cylindrical ball moves in the downstream direction, the spaces between the surface of the ball and the inner surfaces of the ribs 19 are progressively narrowed. This continues until the cylindrical ball itself contacts the inwardly projecting ribs and can move no further in the downstream direction.

Figure 4:
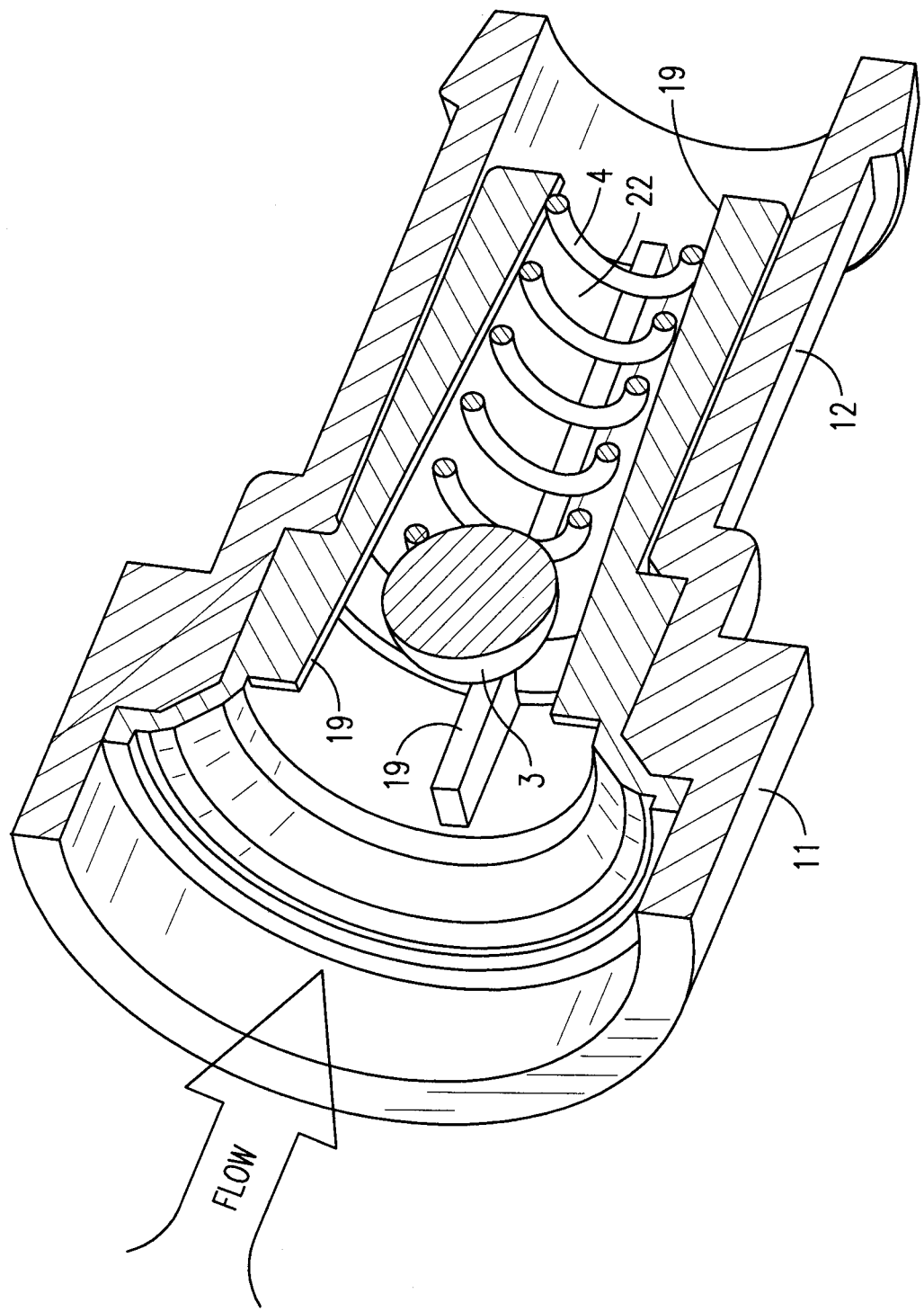
FIG. 4 is a perspective cross sectional view of the flow regulator in its assembled condition.

In operation, the regulator is connected in-line with a heater hose. This may be the hose that feeds hot coolant to a heater coil of a vehicle's heater system. In this case, the regulator is attached at the upstream side of the heater coil before coolant enters the coil. Alternatively, the regulator may be connected in-line with the heater hose that delivers coolant from the heater coil back to the engine or coolant reservoir, in which case it is attached at the downstream side of the heater coil after coolant leaves the heater coil. In either case, the regulator is oriented so that the flow of coolant is directed from the upstream end of the regulator to the downstream end of the regulator as illustrated by the "FLOW" arrow in FIG. 4.

As hot coolant flows through the heater coil, it must pass through the regulator either as the coolant enters the coil or as the coolant leaves the coil. The coolant flowing through the regulator imparts a force on the cylindrical ball 3 of the ball valve assembly 7 in the downstream direction. This, in turn, forces the ball 3 to move in the downstream direction against the bias of the coil spring 4. The magnitude of the movement, and thus the position of the cylindrical ball in the inner channel 22, is proportional to the, amount of force imparted to the ball, which, in turn, is proportional to the flow rate of coolant through the regulator. As flow rate increases, the ball is moved more toward the downstream end of the regulator and as flow rate decreases, the ball is urged by the coil spring back toward the upstream end of the regulator.

When the ball moves toward the downstream end of the regulator, the spaces or gaps between its surface and the tapered ribs 19 becomes progressively narrower. Accordingly, the total open area presented to the flow is progressively reduced. At some point, the ball contacts the ribs (or the spring collapses completely), which closes the gaps to their smallest sizes and presents a minimum open area to the flow that defines a desired regulated flow or flow rate. Conversely, as the ball moves toward the upstream end of the regulator, the gaps between the surface of the ball and the surfaces of the tapered ribs widens, thereby presenting a progressively larger open area to coolant flowing through the regulator. It will thus be understood by those of skill in the art that higher flow rates and pressures of coolant result in a more restricted flow path through the regulator thereby reducing the speed of the flow. Lower flow rates of coolants result in a less restricted flow path through the regulator thereby increasing the flow. This automatic and continuous reaction to flow rate and consequent pressure constantly adjusts to changes in flow rate with the end result that the flow rate is regulated continuously to be within a predetermined desired preferably narrow range. The range is selected to be one that is less destructive to heater cores while still providing sufficient continuous flow for the heater to operate effectively. It has been found that sizing the ribs and the cylindrical ball such that the regulator will allow a flow rate that is about 120-150 percent of the desired regulated flow rate when the ball is biased completely toward the upstream end of the regulator provides good regulation. Further, a filter (not shown) such as a thimble filter for instance may be incorporated into the regulator at, for example, the upstream end of the outer body 1 to trap particulate and other abrasive materials that may become entrained in the flow of coolant. This enhances even more the protection of a heater core provided by the regulator of this disclosure.

The invention has been disclosed in terms and within the context of preferred embodiments and methodologies considered by the inventor to represent the best mode of carrying out the invention. It will be appreciated, however, that a wide range of additions, deletions, and modifications might be made to the preferred embodiments presented herein without departing from the spirit and scope of the invention as set forth in the claims.

What is claimed is:

1. A continuous flow regulator for regulation of the flow of coolant through the heating coil of a vehicle heating system, the continuous flow regulator comprising a body having an upstream end, a downstream end, an internal channel, and a cylindrical portion of the internal channel defined by a cylindrical wall, the body being configured to be coupled in-line with the flow of coolant so that coolant flows through the internal channel from the upstream end of the body to the downstream end of the body, a ball valve assembly disposed within the internal channel and including a ball yieldably biased to a first position adjacent an upstream end of the cylindrical portion, the ball being movable against the bias to a second position adjacent a downstream end of the cylindrical portion, and structures projecting from the cylindrical wall into the cylindrical portion of the internal channel, the structures being configured to progressively restrict flow through the cylindrical portion of the internal channel along a length defined by the first position and the second position.

2. A continuous flow regulator as claimed in claim 1 and wherein the structures comprise inwardly projecting ribs.

3. A continuous flow regulator as claimed in claim 2 and wherein the ribs are tapered from a relatively narrow end at the upstream end of the cylindrical portion to a relatively wider end at the downstream end of the cylindrical portion.

4. A continuous flow regulator as claimed in claim 1 wherein a flow rate through the regulator is about 120-150 percent of a desired regulated flow rate when the ball is biased completely toward the upstream end of the regulator.

5. A continuous flow regulator as claimed in claim 1 wherein the ball is yieldably biased by a spring within the regulator.

6. A continuous flow regulator as claimed in claim 1 wherein the regulator is incorporated into a heater barb.

7. A fluid flow regulator comprising:
   a body having an upstream end and a downstream end;
   the body defining an internal channel extending from the upstream end of the body to the downstream end of the body, and with the internal channel including a cylindrical portion defined by a cylindrical wall;
   an obstruction within the cylindrical portion of the internal channel, the obstruction being sized to move within the internal channel from a first position adjacent an upstream end of the cylindrical portion toward a position adjacent a downstream end of the cyclindrical portion;
   a mechanism for yieldably biasing the obstruction to its first position within the internal channel; and
   structures projecting from the cylindrical wall into the internal channel, the structures projecting a first distance into the internal channel adjacent the upstream end of the cylindrical portion and progressively widening along a length thereof to project a second distance into the internal channel adjacent the downstream end of the cylindrical portion, the second distance being greater than the first distance, to progressively reduce the open area through the internal channel as the obstruction moves within the cylindrical portion from its upstream end toward its downstream end, and to progressively enlarge the open area through the internal channel as the obstructions moves within the cylindrical portion from its downstream end to its upstream end;
   the obstruction moving against the bias of the mechanism for biasing in response to fluid flow through the regulator to regulate the flow of fluid through the internal channel.

8. A fluid flow regulator as claimed in claim 7 wherein the body is configured to be attached to at least one fluid carrying hose.

9. A fluid flow regulator as claimed in claim 7 wherein the obstruction comprises a spherical ball.

10. A fluid flow regulator as claimed in claim 9 wherein the spherical ball is made of metal.

11. A fluid flow regulator as claimed in claim 7 wherein the mechanism for biasing comprises a spring.

12. A fluid flow regulator as claimed in claim 7 wherein the structures projecting from the cylindrical wall into the internal channel comprise at least one longitudinally extending rib.

13. A fluid flow regulator as claimed in claim 12 wherein the at least one rib comprises a plurality of ribs circumferentially spaced around the cylindrical wall.

14. A fluid flow regulator as claimed in claim 7 wherein the internal channel, the obstruction, and the structures are configured such that a flow through the regulator is from about 120 to about 150 percent of a desired regulated flow when the obstruction is biased to its first position.

15. A fluid regulator as claimed in claim 14 wherein the obstruction comprises a ball.

16. A fluid regulator as claimed in claim 15 wherein the mechanism for biasing comprises a spring.

17. A fluid flow regulator as claimed in claim 16 wherein the structures comprise at least one rib projecting inwardly from the cylindrical wall of the cylindrical portion of the internal channel toward the ball.

18. A fluid flow regulator as claimed in claim 17 wherein the at least one rib comprises a plurality of ribs.

19. A fluid flow regulator as claimed in claim 18 wherein the plurality of ribs comprises four ribs.

20. A fluid flow regulator as claimed in claim 19 wherein the four ribs are equally spaced around the circumference of the cylindrical portion of the internal channel.

21. A fluid flow regulator as claimed in claim 7 wherein the obstruction allows for fluid flow through the internal channel in both the first position adjacent the upstream end of the cylindrical portion and in the second position adjacent the downstream end of the cylindrical portion.

22. A continuous flow regulator as claimed in claim 1 wherein the ball allows for fluid flow through the internal channel in both the first position adjacent the upstream end of the cylindrical portion and in the second position adjacent the downstream end of the cylindrical portion.

* * * * *